United States Patent [19]
Gehrke

[11] 3,993,177
[45] Nov. 23, 1976

[54] OVERRUNNING CLUTCH AND RETAINER AND ROLLER ASSEMBLY THEREFOR

[75] Inventor: Gerard William Gehrke, Litchfield, Conn.

[73] Assignee: The Torrington Company, Torrington, Conn.

[22] Filed: Sept. 8, 1975

[21] Appl. No.: 611,258

[52] U.S. Cl. .......... 192/45
[51] Int. Cl.$^2$ .......... F16D 41/06
[58] Field of Search .......... 192/45; 188/82.84

[56] References Cited

UNITED STATES PATENTS

| | | | |
|---|---|---|---|
| 3,260,333 | 7/1966 | Benson et al. | 192/45 |
| 3,500,977 | 3/1970 | Gehrke | 192/45 |
| 3,737,015 | 6/1973 | Johnson et al. | 192/45 |
| 3,746,136 | 7/1973 | Marola et al. | 192/45 |
| 3,820,640 | 6/1974 | Marola et al. | 192/45 |
| 3,863,742 | 2/1975 | Elmore et al. | 192/45 |

*Primary Examiner*—Allan D. Herrmann
*Attorney, Agent, or Firm*—F. S. Troidl

[57] ABSTRACT

The overrunning clutch retainer includes circumferentially spaced crossbars extending between longitudinally spaced rims with the rims and crossbars defining pockets sufficiently large to contain a plurality of rollers such as trunnion ended rollers. A flexible spring associated with each of the crossbars is adapted to contact the nearest roller in the pocket and urge the contacted roller circumferentially toward lockup. The contacted roller presses against the roller next to it and so on.

The retainer and roller assembly is placed in the annular space between an outer member and an inner member of less outside diameter than the inside diameter of the outer member. The outer member is provided with cam surfaces. The retainer is provided with stops which are adapted to prevent rotation of the retainer with respect to the outer member in the unlocking or overrunning direction.

8 Claims, 3 Drawing Figures

OVERRUNNING CLUTCH AND RETAINER AND ROLLER ASSEMBLY THEREFOR

This invention relates to overrunning clutches. More particularly, this invention is a new retainer and roller assembly for overrunning roller clutches, and a new overrunning clutch containing the retainer and roller assembly.

With overrunning clutches of a given predetermined diameter, the more rollers which can be placed in the annular space between the inner and outer members, the better the torque capacity. However, some sort of roller biasing member, such as a spring, is required in order to bias the rollers in one circumferential direction.

In U.S. Pat. No. 3,863,742 granted Feb. 4, 1975, entitled RETAINER FOR OVERRUNNING CLUTCH, a retainer and roller assembly is disclosed including the use of a plurality of rollers per pocket within the retainer. In the retainer disclosed in U.S. Pat. No. 3,863,742 crossbars, themselves, exert the spring bias. That retainer works fine for some cases. However, we have found that for many purposes it is desirable for the crossbars to be rigid and provide an associated spring because the associated spring member may have a greater or lesser degree of flexibility, as desired, than in the spring which is also the crossbar. When the spring is not also the crossbar, it may be designed specifically as the spring, and the design need not be compromised by the dual function.

Briefly described, our new retainer and roller assembly comprises a pair of longitudinally spaced rims with a plurality of circumferentially spaced crossbars interconnecting the rims. The rims and the crossbars are spaced so as to define pockets sufficiently large to contain a plurality of rollers. Rollers are placed in each of the pockets. A flexible spring is associated with each of the crossbars; the spring being adapted to contact the nearest roller in the pocket and urge said contacted roller circumferentially toward the lockup position. The contacted roller presses against the roller next to it, and so on.

My new overrunning clutch comprises the new retainer and roller assembly described in the above paragraph, an outer member, and an inner member of less outside diameter than the inside diameter of the outer member. The outer member is provided with cam surfaces. The retainer is provided with stops which are adapted to prevent rotation of the retainer with respect to the outer member in the unlocking or overrunning direction.

The invention as well as its many advantages may be further understood by reference to the following detailed description and drawings in which.

Throughout the various figures, like parts are referred to by like numbers.

Figure 1:
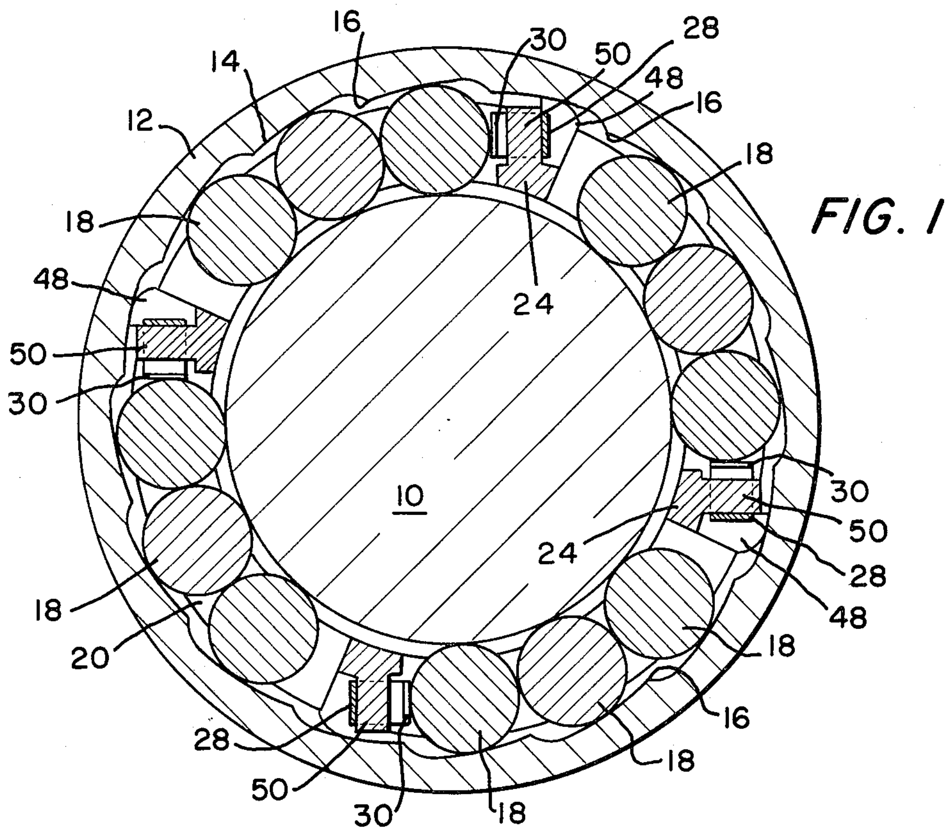
FIG. 1 is a sectional view, illustrating our new overrunning clutch and including our new overrunning clutch retainer and roller assembly.

Referring to the drawings, and more particularly to FIG. 1, the overrunning clutch includes an inner member or rotatable shaft 10 and an outer member such as case 12 of greater inside diameter than the diameter of the shaft 10, thus providing an annular space between the two members. The inside periphery of the case is provided with cam surfaces including ramps 14 and stops 16.

Relative rotation of shaft 10 counterclockwise with respect to case 12, tends to wedge the rollers 18 into decreasing space between the shaft and the cam ramps, causing the clutch to lockup; and the shaft and the case to rotate as a unit. Relative rotation of the shaft with respect to the case in the clockwise direction tends to move the rollers toward the increasing space adjacent to stops 16, causing the rollers to be loose and allowing relative rotation of the shaft and the outer case to take place, freely. This is known as overrunning.

Figure 2:
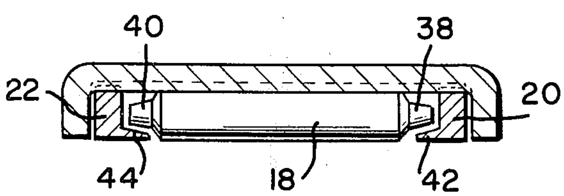
FIG. 2 is a view, partly in section and on a smaller scale than the view of FIG. 1, illustrating the manner of retaining the trunnion ended rollers in the retaining member.
Figure 3:
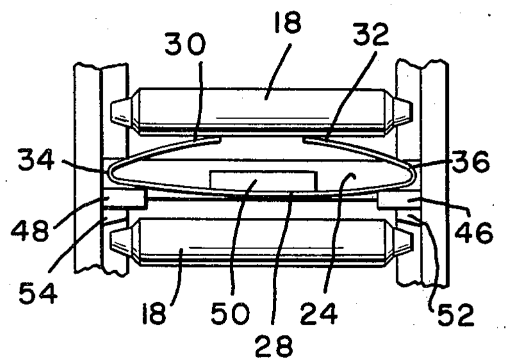
FIG. 3 is a fragmentary view on approximately the same scale as FIG. 2, showing a preferred embodiment of the spring arrangement on the crossbars for use with the trunnion ended rollers.

Referring to FIGS. 1, 2, and 3, our new retainer and roller assembly has a pair of longitudinally spaced rims 20 and 22. A plurality of circumferentially spaced crossbars 24 interconnect the rims 20 and 22. The longitudinally spaced rims and the crossbars define pockets sufficiently large to contain a plurality of rollers, which in the preferred embodiment shown in the Figures are trunnion ended rollers. As shown in FIG. 1, there are three trunnion ended rollers 18 located in each of the pockets defined by the end rims and the crossbars. Various numbers of rollers may be employed in the roller pockets of the cage. It is not necessary that the pockets contain equal numbers of rollers or that the pockets be equal in size.

A flexible spring (see FIG. 3) is associated with each of the crossbars 24. The spring may be a separate member from the crossbars as shown in the figures or, if desired, the spring may be attached to the crossbars 24 as shown in U.S. Pat. No. 3,630,330, or even be integral with the crossbars 24 as shown in U.S. Pat. No. 3,184,020, provided it is a flexible spring and the crossbars 24 are not flexible. In the particular embodiment shown, the spring consists of a base portion 28 and a pair of converging portions 30 and 32, connected to the base 28 by bight portions 34 and 36, respectively.

Different types of rolling members, such as for example flat ended rollers, and spherical ended rollers may be used in accordance with our invention; but the invention is particularly useful with trunnion ended rollers as shown in the figures. As shown in FIG. 2, the trunnion ended rollers 18 include trunnion ends 38 and 40. The longitudinally spaced rims 20 and 22 are provided with longitudinally extending flanges 42 and 44, respectively. The flanges are adapted to support the trunnion ends 38 and 40 of the trunnion ended rollers 18. If flat ended rollers are used instead of the flanges 42 and 44, longitudinally extending members such as tabs (not shown) could be used to support the rollers, if desired.

Each of the rims 20 and 22 are also provided with circumferentially spaced outwardly extending stop members 46 and 48, respectively. The radially outer surfaces of the stop members 46 and 48 are shaped to complement the shape of the stop portions 16 of the cam surfaces on the inner periphery of the casing 12. The stop members prevent the retainer from moving circumferentially clockwise with respect to the casing 12. In the particular embodiment shown, the stop members 46 and 48 also serve along with the spring support member 50 on the outer surface of the crossbar 24 to retain the spring in place. Roller stops 52 and 54 are provided adjacent the back end of retainer stop members 46 and 48 respectively. The roller stops 52 and 54 serve to prevent the trunnion roller 18 closest to the backside of the spring from coming into contact with the base 28 of said spring and the crossbar 24.

Though it is not necessary to have cam surfaces around the entire inner periphery of the casing 12, a particular advantage of having the cam surfaces around the entire periphery is that when the overrunning clutch is assembled, the retainer and roller assembly can be inserted in any cam position; and it is certain that the stop members 48 and 46 will come into engagement with a stop portion 16 on the cam surfaces, and that the rollers will be in proper cam spaces.

I claim:

1. A retainer and roller assembly for an overrunning clutch having an outer member and an inner member of less outside diameter than the inside diameter of the outer member with the outer member having cam surfaces on its inside periphery comprising:

a pair of longitudinally spaced stationary rims; a plurality of circumferentially spaced rigid crossbars interconnecting the rims, the longitudinally spaced rims and the crossbars defining pockets sufficiently large to contain a plurality of rollers, a plurality of rollers in each of said pockets; and a flexible spring associated with each of the crossbars, said spring being adapted to contact the nearest roller in the pocket and urge said contacted roller circumferentially toward the lockup position.

2. A retainer and roller assembly in accordance with claim 1 wherein: spring retaining means are provided at each crossbar and the flexible spring is a separate member inserted into the spring retaining means.

3. A retainer and roller assembly in accordance with claim 1 wherein: each of the rims is provided with longitudinally extending members adapted to support the rollers.

4. A retainer and roller assembly in accordance with claim 1 wherein: the rollers are trunnion ended rollers and each of the longitudinally spaced rims are provided with longitudinally extending flanges adapted to support the trunnions of the trunnion ended rollers.

5. An overrunning clutch comprising: an outer member with cam surfaces; and an inner member of less outside diameter than the inside diameter of the outer member, a retainer and roller assembly located in the annular space between the outer member and the inner member, said retainer and roller assembly having a pair of longitudinally spaced stationary rims, a plurality of circumferentially spaced rigid crossbars interconnecting said rims with said rims and crossbars defining pockets sufficiently large to contain a plurality of rollers, a plurality of rollers in said pockets, and a flexible spring associated with each crossbar and adapted to contact and urge the nearest roller in a circumferential lockup direction, and a stop member adapted to prevent rotation of the retainer with respect to the outer member.

6. The overrunning clutch of claim 5 wherein the cam surfaces extend around the entire inside periphery of the outer member.

7. The overrunning clutch of claim 6 wherein the rollers are trunnion ended rollers and each of the rims have longitudinally extending flanges adapted to support the trunnion ends of the trunnion ended rollers.

8. The overrunning cluth of claim 6 wherein the rims are provided with longitudinally extending members adapted to support the rollers.

* * * * *